UNITED STATES PATENT OFFICE.

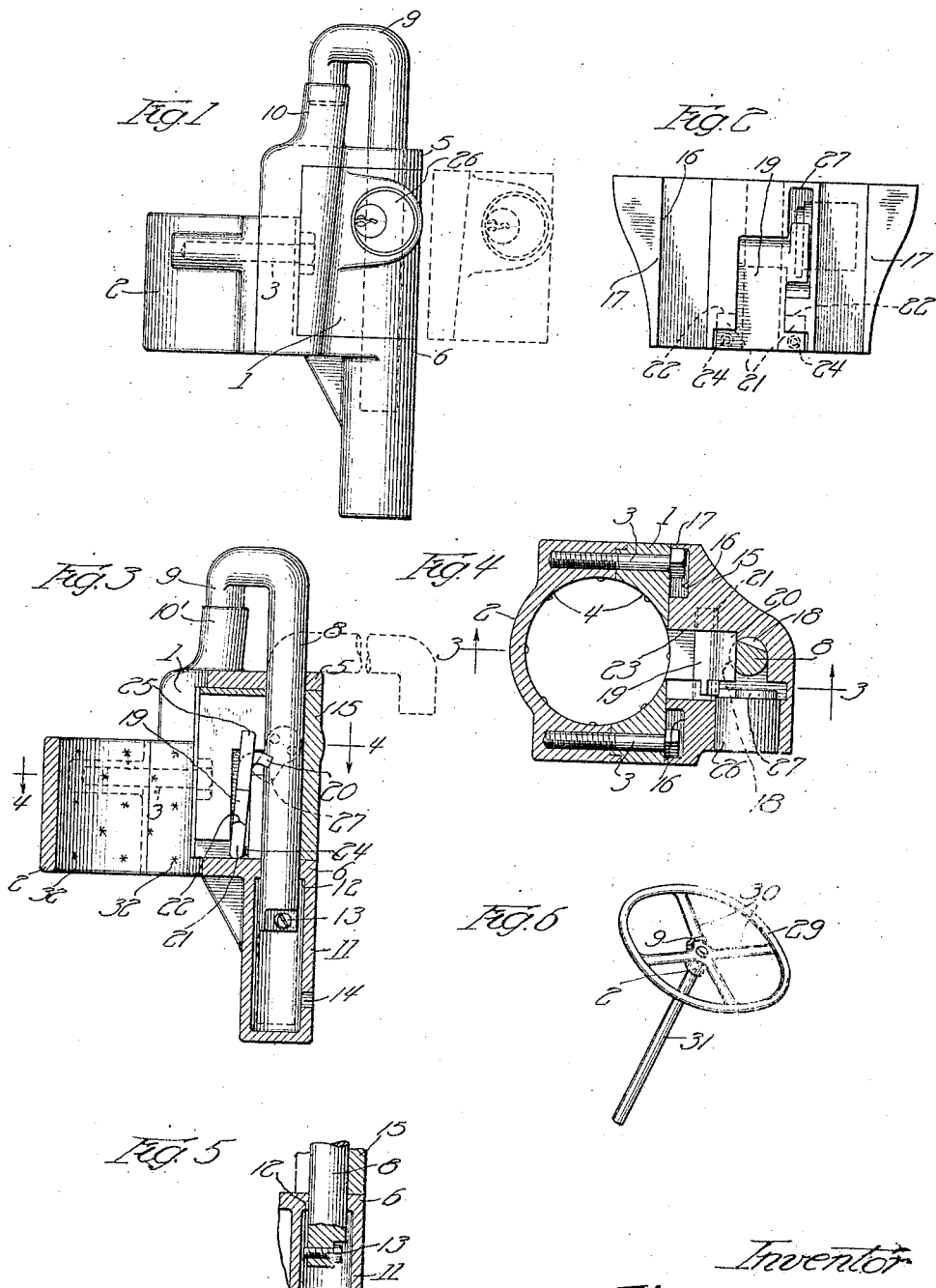

JOHN F. SCHYLANDER, OF CHICAGO, ILLINOIS, ASSIGNOR OF ONE-HALF TO FRANK A. DIENER, OF CHICAGO, ILLINOIS.

AUTOMOBILE-LOCK.

1,375,737.  Specification of Letters Patent.  Patented Apr. 26, 1921.

Application filed October 31, 1919. Serial No. 334,825.

*To all whom it may concern:*

Be it known that I, JOHN F. SCHYLANDER, a citizen of the United States, residing at Chicago, in the county of Cook and State of Illinois, have invented certain new and useful Improvements in Automobile-Locks, of which the following is a description.

My invention belongs to that general class of devices known as automobile locks or the like, which lock, however, may be used wherever found applicable. The invention has among its objects the production of a device of the kind described, that is simple, convenient, durable, efficient, reliable and satisfactory. It has particularly as an object the production of an efficient, durable lock which may be mounted on the steering wheel post or column on an automobile and be used to lock the steering wheel against rotation, so that the automobile or vehicle cannot be driven or towed by other than the authorized person first unlocking the same. The herein described lock is especially designed to prevent the lock being tampered with when locked, or being disassembled or otherwise rendered ineffective while in use. Many other objects and advantages of the construction herein shown and described will be obvious to those skilled in the art, from the disclosure herein given.

To this end my invention consists of the novel construction, arrangement and combination of parts herein shown and described and more particularly pointed out in the claims.

In the drawings, wherein like reference characters indicate like or corresponding parts,—

Figure 1 is a side elevation of my improved lock,

Fig. 2 is a view in elevation of the inner side of the locking plate 15,

Fig. 3 is a sectional view taken substantially on line 3—3 of Fig. 4,

Fig. 4 is a sectional view taken substantially on line 4—4 of Fig. 3,

Fig. 5 is a sectional view of a portion of the lock illustrating the means for retaining the lock bar against accidental withdrawal, and Fig. 6 is a perspective view of an automobile steering wheel with my device applied thereto.

Referring to the drawings, 1 represents what may be termed a base plate, and 2 a coöperating clamping member arranged to be secured to the base plate or part by bolts 3 or their equivalents for the purpose. The parts 1 and 2 are preferably curved or formed with the tubular bore 4 conforming to the contour of the steering collar. The part 1 is formed with two flanges 5 and 6 through which projects a bar 8. Bar 8 is preferably bent over or offset at its upper or exposed end and thence bent down as at 9 and arranged to engage in one or more recesses or the like in the base plate. In the construction shown I have provided two extending parts 10 and 10' at each side of the base plate which are recessed to receive the depending end 9 of locking bar 8. As most clearly shown in Figs. 1, 3 and 5, flange 6 of the base part is provided with a chambered or tubular extension 11 incasing the lower end of the bar 8. Any suitable means may be provided for preventing the accidental withdrawal or displacement of bar 8. As shown, a screw 13 is arranged at the lower end of the bar and adapted to engage with a shoulder 12 at the upper part of the extension 11. The extension 11 is formed with an opening 14 through which a tool may be inserted to adjust the member 13 when the bolt or bar 8 is dropped to its inoperative position. It will be obvious, however, that when the bolt is in operative locking position, or in any position except in its unlocked and dropped position, the screw 13 cannot be tampered with.

Arranged between the flanges 5 and 6 is what may be termed a locking plate 15 which is constructed to surround or incase the bolt 8 between the flanges and to be retained in place by said bolt, so that the same cannot be removed except by first removing the bolt or bar 8. The plate 15 is preferably recessed or constructed with grooves 16 so as to clear the ends of the bolts 3. The same, however, is formed with the side flanges 17 which, with the flanges, entirely conceal the bolt heads. Obviously when the locking plate is secured in place by the locking bar 8, it is impossible to tamper with the bolts 3 and thereby release parts 1 and 2 on the steering post. The parts 1 and 2 are preferably formed with impinging points or the equivalent for preventing sliding or slipping of the parts on the post as hereinafter described.

As may be seen in Figs. 3 and 4, bar 8 is provided with slots 18 arranged to receive a flange 20 of a locking member 19 carried by the locking plate. Member 19 is formed with the projecting parts 21 which engage with shoulders 22 in the plate 15 and form a hinge connection, the plate being recessed as at 23 on the inner face or side. I prefer to provide springs 24 or the equivalent which, bearing against the end of the member 19, tend to throw the same into locking engagement with the bar 8. As most clearly shown in Figs. 2 and 3, member 19 is provided with an extending part 25 which is arranged to be engaged with a locking member 27 arranged on a lock barrel 26. Any suitable key controlled lock mechanism may be employed, but the type shown is a well known form in which a barrel is arranged to be locked in place by a number of tumblers, each lock having different sizes and arrangement of tumblers and keys so that the duplication of keys is remote.

The device is applied to the steering wheel by withdrawing the bar 8, having first moved the screw 13 so that the same may be withdrawn past the shoulder 12, then pulling the bolt out, the member 19 being maintained out of locking position. Plate 15 may then be removed, exposing the ends of bolts 3 so that clamp 2 may be removed. The device is then applied on the steering column 31 (see Fig. 6) below the wheel 29, the bolts 3 being tightened down. If desired the curve faces 4 of the parts 1 and 2 may be formed with little burs 32 or the equivalent, so as to slightly bite or impinge into the steering post. After the bolts have been tightened down, plate 15 is applied and bar 8 inserted substantially as shown in Fig. 3 in the dotted lines, and screw 13 tightened up so as to lock the bolt against accidental withdrawal. The device is then ready for use. When desired to lock the steering wheel, bar 8 is raised, as indicated in Fig. 6, and turned over to overlie one of the spokes 30, and the same is then dropped so as to bring the depending end 9 in the recess in part 10 or 10'. As soon as the bar drops into the position shown in Figs. 1 or 3, the flange 20 is thrown into engagement with the bar, locking the bar against withdrawal. To release the bar it is necessary to insert the key and turn the barrel so as to move arm 27 and throw the locking member so that flange 20 disengages with the notch or groove 18. The bar may then be swung to release the spoke 30 and be dropped out of operative position.

It will be noted that in the construction shown it is not necessary to use the key to lock the device, as turning the bolt will throw the latch or locking member 19 out of operative position and will only engage when the end 9 is dropped into the recess in part 10 or 10'. This is an advantage as the key is only required to unlock the device, consequently there is no temptation to omit locking, rather than bother to find the key and lock the same. Raising and swinging the bar and then pushing the end into one of the recesses automatically locks the device. The various parts are made of suitable material for the purpose, preferably such material that may not be easily broken, cut or bent. The same may be of the desired shape and size and the curved surface 4 is constructed to conform to the particular size steering posts upon which the lock is to be applied. It will be noted, see Fig. 4, that the bolts 3 are locked against rotation by the flanges 17 on plate 15 engaging the heads of the bolts. Accidental loosening of the parts is therefore impossible.

Having thus described my invention, it is obvious that various immaterial modifications may be made in the same without departing from the spirit of my invention; hence I do not wish to be understood as limiting myself to the exact construction, arrangement and combination of parts, or uses mentioned.

What I claim as new and desire to secure by Letters Patent is:

1. A steering wheel lock of the character described comprising a base plate having a surface adapted to conform to a steering column, a clamping member coöperating with said plate for securing said parts together around the steering column, a locking bar slidably supported by said base plate, a locking plate for maintaining said locking bar in a locked position, said locking plate being supported upon the base plate and maintained in position by said locking bar.

2. In a steering wheel lock of the kind described and in combination, a base plate and a coöperating clamping plate, means for securing said plates to the steering wheel column, a slidable bar carried by said base and provided with an exposed end overlying the base plate, a lock plate secured on said base plate by said bar, a locking member carried by said locking plate and arranged to engage said bolt and prevent sliding thereof in one direction, and means for controlling said locking member.

3. In a steering wheel lock of the kind described and in combination, a base plate and a coöperating clamping plate, bolts for securing said plates to the steering wheel column, a slidable bar carried by said base and provided with an exposed end overlying the base plate, a lock plate secured on said base plate by said bar and concealing said bolts, a locking member carried by said locking plate and arranged to engage said bolt and prevent sliding thereof in one direction, and key controlled means for controlling said locking member.

4. In a steering wheel lock of the kind described and in combination, a base plate provided with two extending flanges on one side and curved at the opposite side to conform to the contour of the steering wheel column, a coöperating clamping plate and means for securing said base plate and clamping plate to the steering wheel, a slidable bar carried by said base and provided with an exposed end overlying the base plate and arranged to interengage therewith when the bar is in locking position, a lock plate arranged on said base plate between said flanges and engaged by said slidable bar, a locking member carried by said plate and arranged to interengage with the bar and prevent sliding thereof in a direction to disengage said exposed end with the base plate, and key actuated means for controlling said locking member.

5. A steering wheel lock of the kind described, comprising a base plate, means for securing the said base plate on the steering wheel column, a bar slidably carried by said base plate and movable to engage with a spoke of the wheel, said bar bent over at the end to overlie the spoke and interengage with the top of the base plate part, and means for locking said bar in operative locking position, comprising locking means, a locking plate carrying said locking means, said base plate having parts adapted to receive the locking plate to be maintained in position by said slidable bar.

6. In a steering wheel lock of the kind described and in combination, a base plate, a clamping part, said parts curved to conform to the steering wheel column, bolts extended through the base part and engaging the clamping part, a lock plate mounted on the base plate and overlying and concealing said bolt heads, a slidable lock bar extended through the base part and lock plate and securing the lock plate in place, means for limiting the withdrawal of the bar, said bar offset at its upper end to overlie the base part and bent downwardly at the free end, said base part having recesses in its upper side of a size to receive said bent down portion of the bolt, a locking member arranged to maintain the bar in locked position, and key controlled means for releasing said locking member as desired.

7. A steering wheel lock comprising a base plate having separated flanges, the lower flange being provided with an extension having an opening therein, means for securing the base in position upon a steering wheel collar, a locking bar slidably carried by the base having its lower end entering the extension of said base, and means for locking said bar in position comprising a locking plate disposed between the flanges of the base and maintained in position by the locking bar.

8. A steering wheel lock of the kind described comprising a base plate having a lower flange and an extension depending from said flange formed with an opening, means for securing the base plate upon a steering wheel column, a locking bar carried by the base plate, a portion thereof being adapted to be disposed within the opening in the extension, means carried by the bar and located in the opening in the extension for preventing its accidental withdrawal from the base plate, and locking means supported upon the flange of the base plate for locking the bar in position.

9. A steering wheel lock of the kind described comprising a base plate having a lower flange and an extension depending from said flange formed with an opening, means for securing the base plate upon a steering wheel column, a locking bar carried by the base plate, a portion thereof being adapted to be disposed within the opening in the extension, means carried by the bar and located in the opening in the extension for preventing its accidental withdrawal from the base plate, and locking means supported upon the flange of the base plate for locking the bar in position, said locking means comprising a plate having an aperture therethrough for the passage of the locking bar and adapted to be maintained in position by said locking bar.

10. A steering wheel lock of the kind described comprising a base plate having upper and lower flanges, a locking bar, and means for maintaining said locking bar in a locked position comprising a locking plate disposed between the flanges of the base plate and adapted to be maintained in position by the locking bar.

11. A steering wheel lock of the kind described comprising a base plate having upper and lower flanges, a locking bar, and means for maintaining said locking bar in a locked position comprising a locking plate disposed between the flanges of the base plate and adapted to be maintained in position by the locking bar, the lower flange of the base plate having an extension provided with an aperture adapted to receive the locked bar, and means carried by the locked bar and disposed within the aperture in the extension for preventing accidental withdrawal of the locked bar.

In testimony whereof, I have hereunto signed my name in the presence of two subscribing witnesses.

JOHN F. SCHYLANDER.

Witnesses:
  ROY W. HILL,
  BERNICE DELANEY.